United States Patent [19]

Kominami et al.

[11] 4,182,267
[45] Jan. 8, 1980

[54] APPARATUS FOR KEEPING AQUATIC ANIMALS ALIVE OVER LONG PERIOD OF TIME

[75] Inventors: Naoya Kominami; Hirokazu Fukumi; Naokuni Yamawaki; Junji Nomura; Hiroshi Kayamori, all of Fuji, Japan

[73] Assignee: Asahi Kasei Kogyo Kabushiki Kaisha, Osaka, Japan

[21] Appl. No.: 803,339

[22] Filed: Jun. 3, 1977

[30] Foreign Application Priority Data

Jul. 20, 1976 [JP] Japan .................................. 51-86361

[51] Int. Cl.$^2$ .............................................. A01K 63/00
[52] U.S. Cl. ...................................................... 119/3
[58] Field of Search ................................ 119/2, 3, 4, 5

[56] References Cited

U.S. PATENT DOCUMENTS

| | | | |
|---|---|---|---|
| 2,944,513 | 7/1960 | Keely | 119/2 |
| 3,116,712 | 1/1964 | Ogden et al. | 119/3 |
| 3,261,471 | 7/1966 | Halpert | 119/5 |
| 3,387,587 | 6/1968 | Kelley et al. | 119/2 |
| 3,465,718 | 9/1969 | Handman et al. | 119/2 |
| 3,726,251 | 4/1973 | Fremont | 119/3 |
| 3,884,186 | 5/1975 | Hickey | 119/3 |
| 3,916,834 | 11/1975 | Buss | 119/3 |
| 4,043,299 | 8/1977 | Birkbeck et al. | 119/3 |
| 4,052,960 | 10/1977 | Birkbeck et al. | 119/3 |

Primary Examiner—Hugh R. Chamblee

Attorney, Agent, or Firm—Sprung, Felfe, Horn, Lynch & Kramer

[57] ABSTRACT

Aquatic animals can be kept alive over a long period of time by utilizing the apparatus of the present invention comprising:
 a water tank for containing aquatic animals and environmental water, which tank has an inside volume large enough to contain the aquatic animals in an amount greater than 200 kg per m$^3$ of the environmental water;
 a control path for containing a portion of the environmental water, which control path is located outside the water tank and is connected to the water tank through a windraw pipe and a return pipe line, while containing therein the following means:
  (1) means for controlling the temperature of the environmental water in the control path so that the temperature is maintained at a level as low as it is possible for the aquatic animals to exist,
  (2) means for bringing the environmental water in the control path into contact with air,
  (3) means for eliminating ammonia compounds from the environmental water, and
  (4) means for eliminating water-soluble organic compounds from the environmental water, and;
 a pump for recycling the environmental water through the water tank, the withdraw pipe line, the control path and the return pipe line.

13 Claims, 6 Drawing Figures

APPARATUS FOR KEEPING AQUATIC ANIMALS ALIVE OVER LONG PERIOD OF TIME

The present invention relates to an apparatus for keeping aquatic animals alive over a long period of time. More particularly, the present invention relates to an apparatus for keeping aquatic animals alive in environmental water over a long period of time without feeding them. The term "environmental water" used herein refers to water in which the live aquatic animals are placed to keep them alive. The environmental water may be supplied from the sea, rivers or city water supply.

In order to keep caught aquatic animals alive, for example, fish, shellfish, crustaceans and mollusks, for as long as possible, the aquatic animals are usually placed in a fish preserve provided by partitioning a portion of the sea or a river, and allowed to move freely. However, recently, some portions of the seas and rivers, particularly, those close to big cities, have become heavily polluted. Therefore, the live aquatic animals placed in the fish preserves located in such polluted seas or rivers often die within a short period of time.

In another conventional apparatus, a container contains the live aquatic animals and a pump recycles nonpolluted water through the container. The aquatic animals are allowed to move freely in the container. This type of apparatus is effective for keeping the aquatic animals alive for a long period of time. However, this conventional apparatus requires a container with a large volume as well as a large amount of fresh water, so that the aquatic animals can move freely in the environmental water in the container. Further, this conventional apparatus requires a continuous supply of fresh water into the container and a continuous discharge of water from the container. The continuous supply and discharge of the environmental water results in that the operation cost of this apparatus becomes very high.

Generally speaking, a live aquatic animal has energy metabolism. This energy metabolism involves standard energy metabolism and action energy metabolism. Generally, the value of the metabolic action energy is about 8 to 10 times that of the metabolic standard energy. Therefore, in the case where the live aquatic animal can move freely, it is necessary to feed the aquatic animals. This feeding results in that the operation costs of the conventional apparatus become very high. Further, it is obvious that the conventional apparatus cannot be utilized for the purpose of transporting the live aquatic animals for a long period of time.

An object of the present invention is to provide an apparatus for keeping aquatic animals alive over a long period of time, in a relatively small container, and at a relatively low operation cost.

Another object of the present invention is to provide an apparatus for keeping aquatic animals alive over a long period of time without a continuous supply of fresh environmental water.

A further object of the present invention is to provide an apparatus for keeping aquatic animals alive, this apparatus being utilizable for transporting the aquatic animals for a long period of time.

The above-mentioned objects can be attained by using the apparatus of the present invention. This apparatus comprises:

(A) a water tank for containing aquatic animals and environmental water, which tank has an inside volume large enough to contain the aquatic animals in an amount larger than 200 kg per $m^3$ of the environmental water;

(B) a control path for containing a portion of the environmental water, which control path is located outside the water tank;

(C) a withdraw pipe line connected at one end thereof to the bottom portion of the water tank and connected at the other end thereof to the inlet portion of the control path;

(D) a return pipe line connected at one end thereof to the water tank and connected at the other end thereof to an outlet portion of the control path;

(E) means for controlling the temperature of the environmental water in the control path so that the temperature is maintained as low as it is possible for the aquatic animals to exist, said temperature control means is disposed in the said control path;

(F) means for bringing the environmental water in the control path into contact with air;

(G) means for eliminating ammonia compounds from the environmental water, which ammonia compounds eliminating means is located in the control path;

(H) means for eliminating water-soluble organic compounds from the environmental water, which water-soluble organic compounds eliminating means is located in the control path, and;

(I) a pump for recycling the environmental water through the water tank, the withdraw pipe line, the control path and the return pipe line.

The features and advantages of the present invention will be exemplified and more fully explained in the description presented below with reference to the accompanying drawings, in which.

Figure 1:
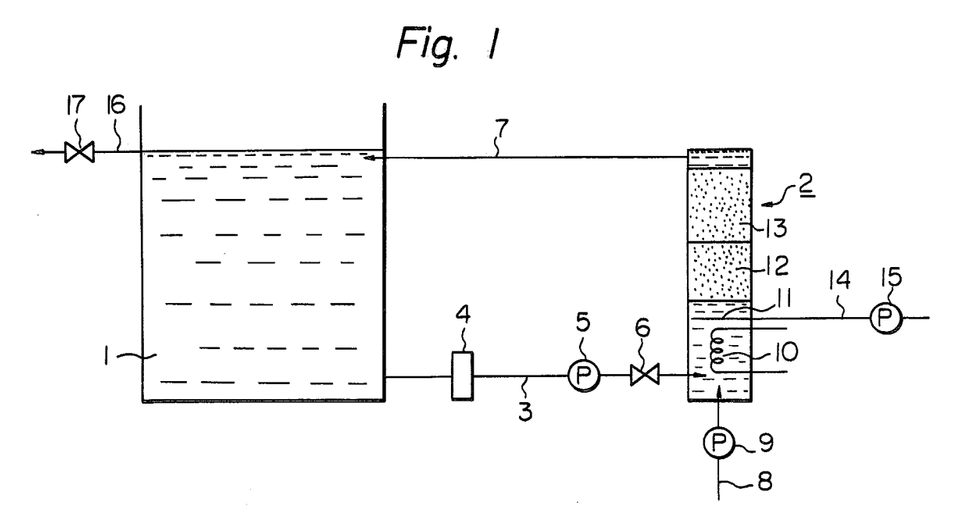
FIG. 1 is an explanatory diagram of an embodiment of the apparatus of the present invention.

Referring to FIG. 1 of the drawings, a water tank 1 for containing aquatic animals and environmental water has an inside volume large enough to contain aquatic animals in an amount of more than 200 kg per $m^3$ of the environmental water. A control path 2 for containing a portion of the environmental water withdrawn from the water tank 1 is located outside the water tank 1. The bottom portion of the water tank 1 is connected to an inlet portion of the control path 2 through a withdraw pipe line 3 having a pump 5 for withdrawing a portion of the environmental water from the water tank 1 and for introducing the withdrawn portion of water it into the control path 2. The withdraw pipe line 3 may be provided with a filter 4 for removing solid materials from the environmental water and a valve 6 for opening and closing the pipe line 3. The outlet portion of the control path is connected to the water tank 1 through a return pipe line 7 through which the withdrawn portion of the environmental water can be returned back into the water tank 1. Accordingly, the environmental water can be recycled through the water tank 1, the withdraw pipe line 3, the pump 5, the control path 2 and the return pipe line 7. The outlet end of the return pipe line 7 may be opened at any portion of the water tank 1 as long as the returned water can be uniformly distributed in the water tank 1 and, then, evenly withdrawn at the inlet end of the withdraw pipe line 3. If it necessary, the return pipe line 7 can be provided with a pump and a valve which are not shown in FIG. 1. The control path 2 is connected at its inlet portion to a supply source of fresh environmental water (not shown in FIG. 2) through a supply pipe 8 and a pump 9. The control path 2 contains therein a means 10 for controlling the temperature of the environmental water in the control path 2 at the lowest possible temperature at which the aquatic animals are able to exist, a means 11 for bringing the environmental water in the control path into contact with air, a means 12 for eliminating ammonia compounds, and a means 13 for eliminating water soluble organic compounds from the environmental water.

The temperature control means 10 may be composed of a heat-exchanger through which a heating medium or a cooling medium can flow as shown in FIG. 1. The temperature control means 10 is preferably located in the inlet portion of the control path 2.

The means 11 for bringing the environmental water into contact with air is preferably composed of an air pipe 14 connected to an air blowing pump 15 as shown in FIG. 1. An end portion of the air pipe 14 inserted into the control path 2 has a number of holes through which air bubbles are blown into the environmental water flowing in the control path 2.

The means 12 for eliminating the ammonia compounds may be a mass of adsorbing material which allows the environmental water to flow therethrough. The means 13 for eliminating the water-soluble organic compounds may also be a mass of adsorbing material which allows the environmental water to flow therethrough.

The water tank 1 may have a discharge pipe 16 for discharging the environmental water from the water tank 1. The discharge pipe 16 may be provided with a valve 17 for opening and closing the discharge pipe 16, and may be located at an upper part of the water tank 1 for discharging the portion of the environmental water which has overflowed from the water tank 1, as shown in FIG. 1.

It is well known that when live aquatic animals are kept in environmental water, the environmental water is contaminated with excretions of the aquatic animals due to their metabolism. As stated hereinbefore, the metabolism involves standard metabolism and action metabolism, and the value of the metabolic action energy is about 8 to 10 times that of the metabolic standard energy. Also, it is known that the value of the metabolic standard energy of the aquatic animal at a certain temperature can be reduced to one half of the above-mentioned value by lowering the temperature of the aquatic animals to a temperature 10° C. below the above-mentioned certain temperature. Further, it is known that the value of the metabolic action energy of the aquatic animal can be reduced by restricting the movement of the aquatic animals. However, it has been long believed that in order to keept the aquatic animals alive, it is necessary to maintain the aquatic animals at an optimum temperature at which the aquatic animals can exist while allowing the aquatic animals to move freely. It has also been believed that when the live aquatic animals are contained in a relatively large amount of from 80 to 200 kg/m$^3$ in the environmental water, the aquatic animal can be kept alive for only about 50 hours or less.

Contrary to the above the inventors of the present invention discovered that as long as each of the concentrations of ammonia compounds, water-soluble organic compounds, carbonic acid radical and molecular oxygen in the environmental water is controlled so as to be maintained at a predetermined value, the aquatic animals can be kept alive over a long period of time even if the aquatic animals are restricted in their movement in the environmental water at the lowest possible temperature at which the aquatic animals are able to exist. The present invention is based on this discovery. That is, in the apparatus of the present invention, the aquatic animals are contained in an extremely large amount more than 200 kg/m$^3$, preferably, greater than 200 kg/m$^3$ but not exceeding 700 kg/m$^3$, more preferably, from 250 to 600 kg/m$^3$, in the environmental water, and the temperature of the environmental water is maintained at a level as low as it is possible for the aquatic animals to exist. The high density of the aquatic animals results in restriction in movement of the aquatic animals in the environmental water, and this restriction causes a low consumption of the metabolic action energy of the aquatic animals.

For example, when adult prawns each having an average weight of 30 g are placed in an amount of 300 kg/m$^3$ in the environmental water the prawns substantially cannot move. The low temperature of the environmental water results in a low consumption of the metabolic standard energy of the aquatic animals. Therefore, under these circumstances, most of the metabolic energy of the aquatic animals is consumed for the purpose of maintaining their life. This results in the life of the aquatic animals being extended. When the apparatus of the present invention is utilized, the extended life of the aquatic animal is about 10 to 20 times that of the aquatic animal maintained in the conventional apparatus.

In the apparatus of the present invention, the temperature of the environmental water is adjusted, for example, in the case of adult red sea-bream, from 7° to 12° C.; in the case of adult carps, from 3° to 20° C.; in the case of adult eels, from 10° to 15° C., and in case of adult prawns, from 10° to 15° C.; in case of abalones, from d 5 to 14° C. and in case of ask shells from 3° to 12° C.

While the aquatic animals are being kept alive in the environmental water, the aquatic animals consume molecular oxygen dissolved in the environmental water and excrete carbon dioxide ammonia compounds and water-soluble organic compounds, such as ammonia; primary, secondary and tertiary amines, for example, urea, uric acid, creatine, creatinine, and trimethyl amine; higher fatty acids; lipids and proteins. The aquatic animals cannot be kept alive in environmental water containing certain amounts of the above-mentioned excreted compounds and a very small amount of molecular oxygen.

The supply of the molecular oxygen into the environmental water and the removal of the carbon dioxide from the environmental water can be effected by bringing the environmental water into contact with air so as to allow the molecular oxygen in the air to dissolve into the environmental water and, also, so as to allow the carbon dioxide in the environmental water to be released from the environmental water into the air. The contact of the environmental water with the air may be effected by blowing and bubbling air into the environmental water or by spraying the environmental water into the atmospheric air. These operations are simple and economical.

However, the ammonia compounds are very soluble in water and at a pH of 7 to 9, at which the aquatic animals can exist, most of the ammonia compounds are in the form of onium compounds such as ammonium chloride which are non-volatile. Accordingly, the ammonia compounds cannot be removed from the environmental water by the above-mentioned contact of the environmental water with the air. Also, the water-soluble organic compounds, such as, urea, uric acid, creatine, creatinine, amino acids, higher fatty acids and trimethylamine, lipids and proteins which are non-volatile cannot be removed by the simple contact of the environmental water with the air.

In the apparatus of the present invention, the aquatic animals are placed in an extremely large amount more than 200 kg/m$^3$ in the environmental water and the temperature of the environmental water is maintained at a level as low as it is possible for the aquatic animals to exist. The high density and the low temperature cause a low consumption of the molecular oxygen and low excretions of carbon dioxide, ammonia compounds and water-soluble organic compounds by the aquatic animals in the environmental water. Also, in the apparatus of the present invention, the concentrations of the ammonia compounds, the water-soluble organic compounds and the carbonic acid radical in the environmental water are controlled so as to be maintained at levels not exceeding 20 ppm, 150 ppm and 1000 ppm, respectively. Also, the concentration of the molecular oxygen dissolved in the environmental water is controlled so as to be maintained at 3 ppm or more.

The elimination of the ammonia compounds from the environmental water may be effected by bringing the environmental water into contact with a mass of adsorbing material which is capable of allowing the environmental water to flow through the mass. The adsorbing material may be selected from organic polymeric ion-exchange resins; inorganic ion-exchange materials, for example, natural zeolite, synthetic zeolite, aluminium alumino-silicate, magnesium alumino-silicate, silica, alumina, acid clay and activated clay; zirconium type ion-exchange materials, for example, zirconium phosphate, zirconium tungstate and zirconium molybdate; activated carbon; and, mixtures of two or more of the above-mentioned materials. These materials are very effective for removal of the ammonia compound even by using them in a relatively small amount.

The above-mentioned adsorbing materials are particularly effective for eliminating ammonia compound from sea water. When the environmental water is supplied from a river or city water system, the adsorbing material may be an organic polymeric ion-exchange resin, for example, a strong acidic cation-exchange resin, such as, sulfonic acid and salt type cation-exchange resins, and a weak acidic cation-exchange resin, such as, carboxylic acid and salt type cation-exchange resins. The ion-exchange resin may be used in a mixture with the aforementioned adsorbing materials. In this case, the adsorbing material containing the cation-exchange resin can remove a small amount of certain kinds of amine compounds from the environmental water. The ammonia compounds may be eliminated by using a reverse osmosis device or an ion-exchange membrane device.

The elimination of the water-soluble organic compounds from the environmental water may be effected by bringing the environmental water into contact with a mass of adsorbing material which is capable of allowing the environmental water to flow through the mass. The adsorbing material may be selected from natural and synthetic zeolites, activated carbon, silica, silica-alumina, bone black, acid clay, activated clay, aluminium alumino-silicate, magnesium alumino-silicate, and mixtures of two or more of the above-mentioned materials.

The water-soluble organic materials may be eliminated from the environmental water by bringing the environmental water into contact with aluminium hydroxide, so as to allow the organic compounds to coagulate and precipitate together with the aluminium hydroxide, and then separating the precipitation from the environmental water.

The elimination of the carbonic acid radical (carbon dioxide dissolved in the environmental water) may be carried out by bringing the environmental water into contact with atmospheric air by any of the conventional methods, for example, a method in which the air is blown and bubbled into the environmental water or a method in which the environmental water is sprayed or ejected into the atmospheric air. By these methods, the carbonic acid radical is released in the form of carbon dioxide from the environmental water into the atmospheric air.

The molecular oxygen can be supplied into the environmental water by bringing the environmental water into contact with air. This contact can be realized by blowing and bubbling air into the environmental water or by spraying or ejecting the environmental water into the atmospheric air. During the time in which the air contacts the environmental water, the molecular oxygen in the air can be dissolved into the environmental water. In place of air, oxygen gas may be used.

The temperature of the environmental water can be adjusted by using any of the conventional devices in which the environmental water is heated or cooled to a desired temperature.

Figure 2:
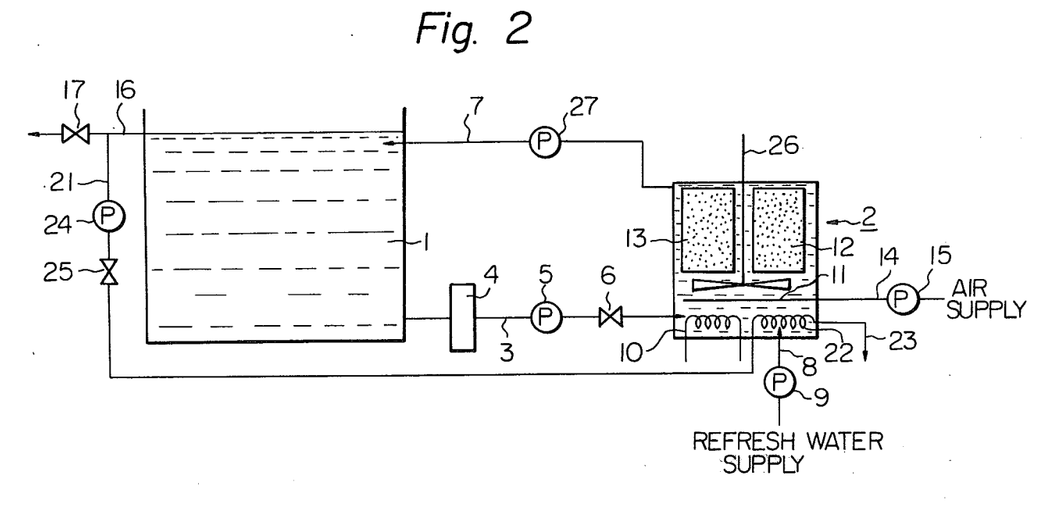
FIG. 2 is an explanatory diagram of another embodiment of the apparatus of the present invention.

In the apparatus shown in FIG. 2, the discharge pipe 16 has a branch pipe line 21 connected to a heat-exchanger 22 located within the inlet portion of the control path 2. When the valve 17 is closed, a portion of the environmental water overflowed from the water tank 1 is introduced into the heat-exchanger 22 for causing heat-exchange to occur between the overflowed environmental water and the fresh environmental water supplied into the inlet portion of the control path 2 through the supply pipe 8 and pump 9. Then, the portion of the overflowed environmental water is discharged through a pipe 23 to the outside of the apparatus. The branch pipe line 21 may be provided with a pump 24 and a valve 25. In the control path 2 shown in FIG. 2, the ammonia compounds eliminating means 12 and the water-soluble organic compounds eliminating means 13 are arranged in parallel to each other. A stirrer 26 is also disposed in the control path 2 for agitating the environmental water in the control path 2 and for causing the environmental water to pass through the eliminating means 12 and 13. The return pipe line 7 has a pump 27 for forcibly sending the environmental water from the control path 2 into the water tank 1.

Figure 3:
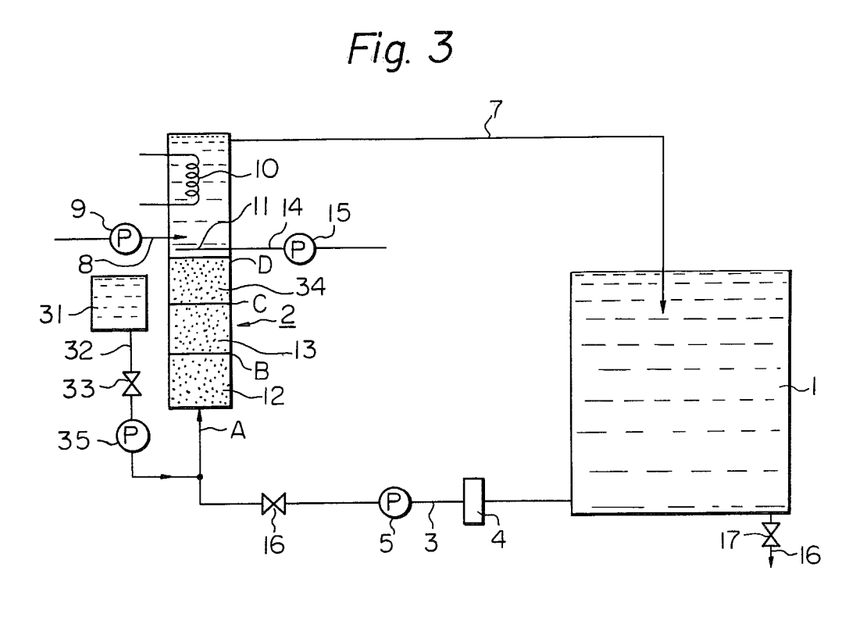
FIG. 3 is an explanatory diagram of a further embodiment of the apparatus of the present invention.

In the apparatus shown in FIG. 3, a tank 31 for storing a solution of an oxidizing agent is connected to an outlet end portion of the withdraw pipe line 3 through a pipe 32, a pump 35 and a valve 33 for causing an oxidizing agent solution to be admixed into the withdrawn portion of the environmental water. In the apparatus shown in FIG. 3, the environmental water containing the oxidizing agent flows through the control path 2. In the control path 2, the environmental water comes into contact with the ammonia compounds eliminating means 12, the water-soluble organic compounds eliminating means 13 and finally, the means 34 for decomposing the remaining oxidizing agent. In the decomposing means 34, the remaining oxidizing agent is converted into a substance which is non-toxic to the aquatic animals. Thereafter, the environmental water is brought into contact with air by the air contacting means 11, and the temperature of the environmental water is adjusted to a desired temperature by the means 10. The oxidizing agent may be selected from hypohalogenic acid compounds, for example, hypochloric compounds or hypobromic acid compounds; hypoionic acid compounds; hydrogen peroxide, ozone; and mixtures of two or more of the above-mentioned substances.

The most preferable hypohalogenic acid compound is sodium hypochlorite. This compound has a high oxidizing efficiency, and the resultant compounds from the oxidation of the ammonia compounds and the organic compounds, and the decomposition product of the sodium hypochlorite, are non-toxic to the aquatic animals. Even if the sodium hypochlorite is used for the environmental water of fresh-water aquatic animals, there is no toxicity problem with regard to the aquatic animals.

The most preferable means for converting the remaining oxidizing agent into a substance which is non-toxic to the aquatic animals is a mass of catalyst effective for the decomposition of the remaining oxidizing agent The catalyst for decomposing the remaining oxidizing agent may be selected from natural zeolite, synthetic zeolite, aluminium alumino-silicate, magnesium alumino-silicate, silica, alumina, activated clay, acid clay, activated carbon made from coconut shell, activated carbon made from coal, and mixtures of two or more of the above-mentioned materials. In view of the decomposition capacity per unit volume, the most preferable catalyst is the above-mentioned activated carbons, which are effective for all types of oxidizing agents.

In an experiment conducted by the inventors of the present invention, when sea water containing 10 ppm of sodium hypochlorite was brought into contact with 400 ml of natural zeolite of 3 mm in size per particle obtained from Miyagi-Ken, Japan, at a flow rate of 6 liters/hr., the treated sea water contained 3.1 ppm of the sodium hypochlorite. That is, 69% by weight of the sodium hypochlorite was decomposed. In comparison with the natural zeolite, when activated carbon of 3 mm in size per particle was used, the treated sea water contained 0.6 ppm of the sodium hypochlorite. That is, 99.4% by weight of the sodium hypochlorite was decomposed.

The operational conditions to be set forth for eliminating the ammonia compounds include the kind, structure, shape and amount of the adsorbing material, the kind and amount (supply rate) of the oxidizing agent, the structure of the control device in which the elimination is carried out, and the flow rate of the environmental water to be treated (residence time of the environmental water in the control device). These conditions should be set forth so as to obtain an optimum result. For example, when sea water containing 2 ppm of ammonia compounds flows at a flow rate of 6 liters/hr through 280 g (400 ml) of natural zeolite of 3 mm in size per particle, and the initial concentration of sodium hypochlorite added to the sea water is 27.8 ppm, the treated sea water contains 0.21 ppm of the ammonia compounds. When 135 g (300 ml) of synthetic aluminium alumino-silicate of 3 mm in size per particle, having a ratio by weight of $Al_2O_3:SiO_3$ of 23:77, are used in place of the natural zeolite, the treated sea water contains 0.28 ppm of the ammonia compounds.

The operational conditions for eliminating the water-soluble organic compounds should be set forth in the same manner as stated for the operational conditions for eliminating the ammonia compounds. For example, when sea water containing 10 ppm of the water-soluble organic compounds flows at a flow rate of 6 liters/hr through 160 g (400 ml) of activated carbon and the initial concentration of the sodium hypochlorite is 10 ppm, the resultant sea water contains 1.8 ppm of the organic compounds.

The treating conditions for the environmental water may be set forth based on the kind and amount of the aquatic animals, the amount of the environmental water to be treated, the excretions of the ammonia compounds and organic compounds, and the resistance of the aquatic animals to the ammonia and organic compounds. For example, in the case where 1.3 kg of live prawns, each having an average weight of about 30 g, are placed in 3.6 liters of the environmental sea water, and the environmental water is recycled at a flow rate of 6 liters/hr, the ammonia compounds and the water-soluble organic compounds excreted by the prawns can be almost completely eliminated by using 280 g of natural zeolite of 3 mm in size per particle for eliminating the ammonia compounds, 160 g of activated carbon of 3 mm in size per particle for eliminating the water-soluble organic compounds, and adjusting the concentration of the sodium hypochlorite in the environmental water to 27.8 ppm. That is, the environmental water can be maintained at a concentration of the ammonia compound of 1 ppm or less and at a concentration of the water-soluble organic compounds of 10 ppm or less. In the above-mentioned case, the concentration of the residual sodium hypochlorite in the treated environmental water is 4.6 ppm. The residual amount of the sodium hypochlorite can be almost completely decomposed by bringing the treated environmental water into contact with 240 g of activated carbon of 3 mm in size per particle.

In the apparatus of the present invention, the means for eliminating the ammonia compounds and the means for eliminating the water-soluble organic compounds may be arranged in an optional order in the control path. Also, in the apparatus of the present invention, the temperature control means and the air-contacting means may be separately located either upstream or downstream of the means for eliminating the ammonia compounds and water-soluble organic compounds. In the apparatus of FIGS. 1 and 2, the temperature control means 10 and the air contacting means 11 are arranged upstream of the means 12 for eliminating the ammonia compounds and of the means 13 for eliminating the water-soluble organic compounds. In the apparatus of FIG. 3, the temperature control means 10 and the air-contacting means 11 are located downstream of the means 12 for eliminating the ammonia compounds and of the means 13 for eliminating the water-soluble organic compounds.

Figure 4:
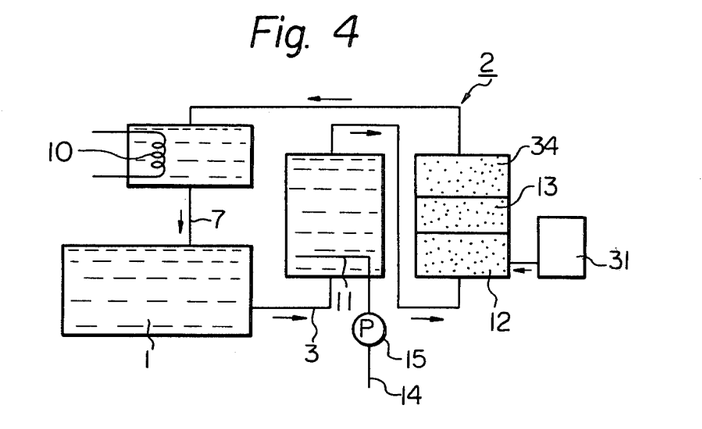
FIG. 4 is an explanatory diagram showing an arrangement of the constituent parts of the apparatus of the present invention.

In the apparatus shown in FIG. 4, the air-contacting means 11 is located between the water tank 1 and the ammonia compounds eliminating means 12, and the temperature control means 10 is located between the means 34 for decomposing the oxidizing agent and the water tank 1.

Figure 5:
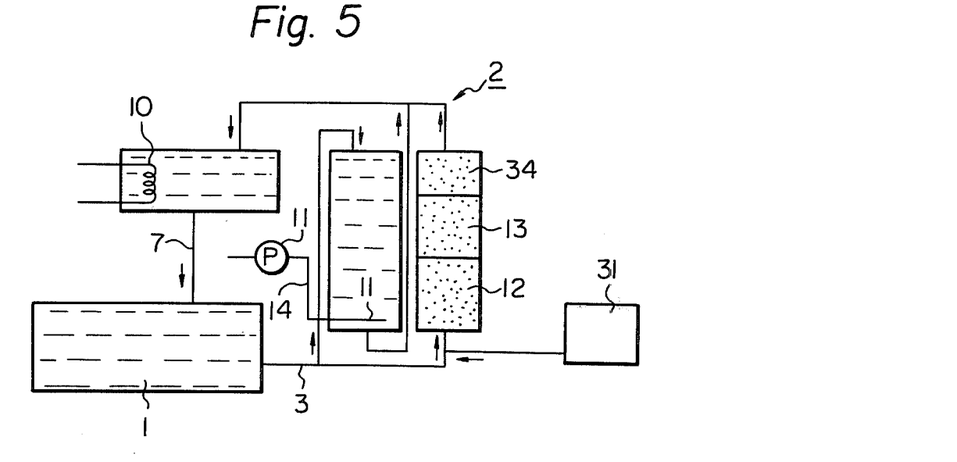
FIG. 5 is an explanatory diagram showing another arrangement of the constituent parts of the apparatus of the present invention.
Figure 6:
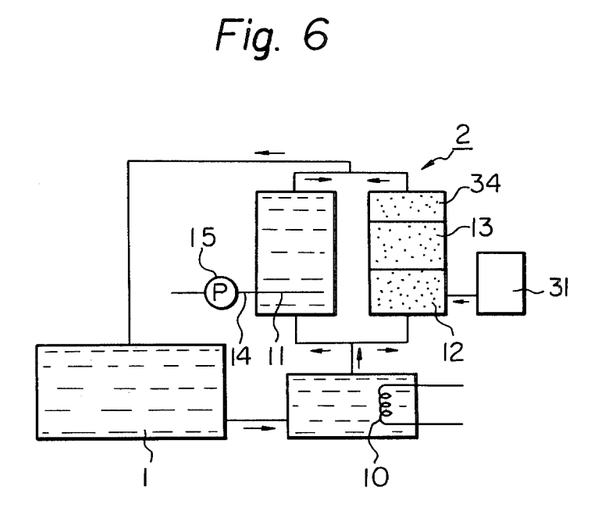
FIG. 6 is an explanatory diagram showing a further arrangement of the constituent parts of the apparatus of the present invention.

In the apparatus of the present invention, the air-contacting means 10 may be arranged in parallel to an assembly of the ammonia compounds eliminating means 12, the water-soluble organic compounds eliminating means 13 and the oxidizing agent decomposing means 34, as shown in FIGS. 5 and 6.

The apparatus of the present invention can be utilized for any kind of aquatic animals, for example, adults and fries of (A) aquatic animals of Class Osteichthys, for example, sea breams such as *Chrysophrys major, Oplegnathus fasciatus* and *Mylio macrocephalus;* pink salmons such as *Oncobynchus nerka* and *Salmogairdnerii irideus;* sweet fish, namely, *Plecoglossus altivelis;* loach, namely, *Misgurnus anguillicaudatus;* crucian, namely, *Carassius carassius;* carp, namely, *Cyprinus carpio;* eel, namely, *Anguilla japonica;* conger eel, namely, *Conger japonicus;* horse mackerels such as *Trachurus japonicus* and *Caranx delicatissmus;* sea bass, namely *Lateolabrax japonicus,* puffer such as *Fugurubripes rubripes;* and flat fishes such as *Paralichthys olivaceus, Limanda herzensteini* and *Limanda yokohamae;* (B) aquatic animals of Arthropoda Class Crustacea: for example, prawns such as *Penaeus japonicus, Penaecus semisulcatus* and *Metapeneus joyneri;* shrimps such as *Sergestes lucens, Pandalus kessleri* and *Pandalus borealis;* lobsters such as *Panulirus japonicus;* and crabs such as *Erimacrus isenbeckii, Parlithodes camtchatica, Chionoecetes pitio, Portunus tribuberculatus* and *Macrocheria kaempferic;* (C) aquatic animals of Mollusca Class Lamellibranchia: for example, oysters, such as, *Osteria gigas;* scallops such as *Pecten yessoensis,* ask shells such as *Anadara broughtonii;* cockle, namely, *Fulvia mutica;* and hard clams such as *Meretrix meretrix lusoria;* (D) aquatic animals of Mollusca Class Gostropoda: for example, abalones such as *Haliotis gigantea, Haliotis sieboldi, Haliotis kamtschatkana, Haliotis japonica* and *Haliotis discus;* and (E) aquatic animals of Echinodermata: for example, sea-urchins such as Echinoidea; and sea-cucumbers such as Holoihuroidea; (F) onomats such as *Amyda sinensis;* (G) edible frogs such as *Pana catesbiana;* and (H) edible snails such as *Hilix ponatia.*

By utilizing the apparatus of the present invention, the aquatic animals can be kept alive for a long period of several days to several weeks or more. Before the present invention, it was never possible to keep aquatic animals alive for the above-mentioned long period of time. Accordingly, it is obvious that the apparatus of the present invention is very valuable and practical.

What we claim is:

1. An apparatus for keeping aquatic animals alive over a long period of time comprising:
   (A) a water tank for containing aquatic animals and environmental water;
   (B) a control path for containing a portion of said environmental water, said control path being located outside said water tank;
   (C) a withdraw pipe line connected at an end thereof to a bottom portion of said water tank and also connected at the other end thereof to an inlet portion of said control path;
   (D) a return pipe line connected at an end thereof to said water tank and also connected at the other end thereof to an outlet portion of said control path;
   (E) means for controlling the temperature of said environmental water in said control path so that it is maintained at a level as low as it is possible for the aquatic animals to exist, said temperature control means being disposed in said control path;
   (F) means for bringing said environmental water in said control path into contact with air;
   (G) means for eliminating ammonia compounds from said environmental water, said eliminating means being located in said control path;
   (H) means for eliminating water-soluble organic compounds from said environmental water, said eliminating means being located in said control path;
   (I) a pump for recycling said environmental water through said water tank, said withdraw pipe line, said control path and said return pipe line;
   (J) a supply source of an oxidizing agent connected to said withdraw pipe line at a location upstream from said ammonia compounds eliminating means and said water-soluble organic compounds eliminating means; and
   (K) means for converting said oxidizing agent into a substance which is non-toxic to said aquatic animals, contained in said control path and located downstream from said ammonia compounds eliminating means and said water-soluble organic compounds eliminating means.

2. An apparatus as claimed in claim 1, wherein said water tank has an outlet for discharging said environmental water therefrom, and said control path has a supply inlet connected to a supply source of fresh environmental water.

3. An apparatus as claimed in claim 2, wherein said discharge outlet of said water tank is connected to a heat exchanger located close to said supply inlet of said control path.

4. An apparatus as claimed in claim 1, wherein said temperature control means has a heater and a cooler.

5. An apparatus as claimed in claim 1, wherein said means for eliminating ammonia compounds is a mass of adsorbing material capable of allowing said environmental water to flow therethrough.

6. An apparatus as claimed in claim 5, wherein said adsorbing material is selected from organic polymeric cation-exchange resins, natural zeolite, synthetic zeolite, aluminium alumino-silicate, magnesium aluminosilicate, zirconium phosphate, zirconium tungstate, zirconium molybdate, activated carbon and mixtures of two or more of the above-mentioned materials.

7. An apparatus as claimed in claim 6, wherein said organic polymeric cation-exchange resin is selected from sulfonic acid and salt type strong acidic cation-exchange resins and from carboxylic acid and salt type weak acidic cation-exchange resins.

8. An apparatus as claimed in claim 1, wherein said means for eliminating water-soluble organic compounds is a mass of adsorbing material capable of allowing said environmental water to flow therethrough.

9. An apparatus as claimed in claim 8, wherein said adsorbing material is selected from activated carbon, silica, silica-alumina, bone black, acid clay, activated clay and mixtures of two or more of the above-mentioned materials.

10. An apparatus as claimed in claim 1, wherein said means for bringing said environmental water into contact with air is composed of an air pipe inserted into said control path, said pipe having a number of holes and being connected to an air blowing pump.

11. An apparatus as claimed in claim 1, wherein said means for recycling said environmental water is at least one pump located in at least one of said withdraw pipe line and said return pipe line.

12. An apparatus as claimed in claim 1, wherein said supply source of said oxidizing agent is a tank containing a solution of said oxidizing agent selected from hypohalogenous compounds, hydrogen peroxide, ozone and mixture of two or more of the above-mentioned materials.

13. An apparatus as claimed in claim 1, wherein said oxidizing agent converting means is a mass of a catalyst effective for decomposing said oxidizing agent, said catalyst being selected from activated carbon, natural zeolite, synthetic zeolite, aluminium alumino-silicate, magnesium alumino-silicate or a mixture of two or more of the above-mentioned materials.

* * * * *